United States Patent [19]

Kotake et al.

[11] Patent Number: 4,967,858
[45] Date of Patent: Nov. 6, 1990

[54] POWER STEERING APPARATUS WITH UNITARY TORQUE SENSOR AND WORM DRIVING HOUSING

[75] Inventors: Yoshimi Kotake, Osaka; Hajime Kozuka, Tokyo; Mitsuharu Morishita; Tadayuki Hara, both of Himeji, all of Japan

[73] Assignee: Mitsubishi Denki Kabushiki Kaisha, Tokyo, Japan

[21] Appl. No.: 360,931

[22] PCT Filed: Sep. 9, 1988

[86] PCT No.: PCT/JP88/00914
§ 371 Date: Mar. 13, 1989
§ 102(e) Date: Mar. 13, 1989

[87] PCT Pub. No.: WO89/02386
PCT Pub. Date: Mar. 23, 1989

[30] Foreign Application Priority Data

Sep. 11, 1987 [JP] Japan .................. 62-228744

[51] Int. Cl.⁵ ............................. B62D 5/04
[52] U.S. Cl. ...................... 180/79.1; 73/118.1; 73/862.33; 439/15
[58] Field of Search ............ 180/79.1; 73/862.33, 73/118.1; 439/15, 164; 318/628

[56] References Cited

U.S. PATENT DOCUMENTS

| | | | |
|---|---|---|---|
| 4,173,265 | 11/1979 | Kremer | 180/79.1 |
| 4,650,019 | 3/1987 | Yanai et al. | 180/79.1 |
| 4,739,855 | 4/1988 | Miyoshi et al. | 180/79.1 X |
| 4,836,795 | 6/1989 | Schauer | 439/15 X |

FOREIGN PATENT DOCUMENTS 37581 2/1986 Japan .................. 180/79.1

Primary Examiner—Mitchell J. Hill
Attorney, Agent, or Firm—Sughrue, Mion, Zinn, Macpeak and Seas

[57] ABSTRACT

A power steering apparatus includes a motor 5 connected through a clutch 6 and a worm gear mechanism 50,51 with a steering column 12. A multi-lead strap 46 is wound around the steering column within a first cylindrical housing 23 for electrically connecting a torque sensor 4 to terminals disposed outside the steering column. The worm gear mechanism includes a worm wheel 50 fitted on the steering column in the first housing, and a worm shaft 51 in mesh with the worm wheel and disposed in a second cylindrical housing 54 adjacent the first housing. The second housing has one end closed and the other end open. The worm shaft is rotatably supported at one end by a first bearing 52 press fitted in the closed end of the second housing and at its other end, which is connected with the clutch, by a second bearing 53 fixedly mounted thereon, such that the worm shaft can be axially removed from the second housing through its open end.

7 Claims, 5 Drawing Sheets

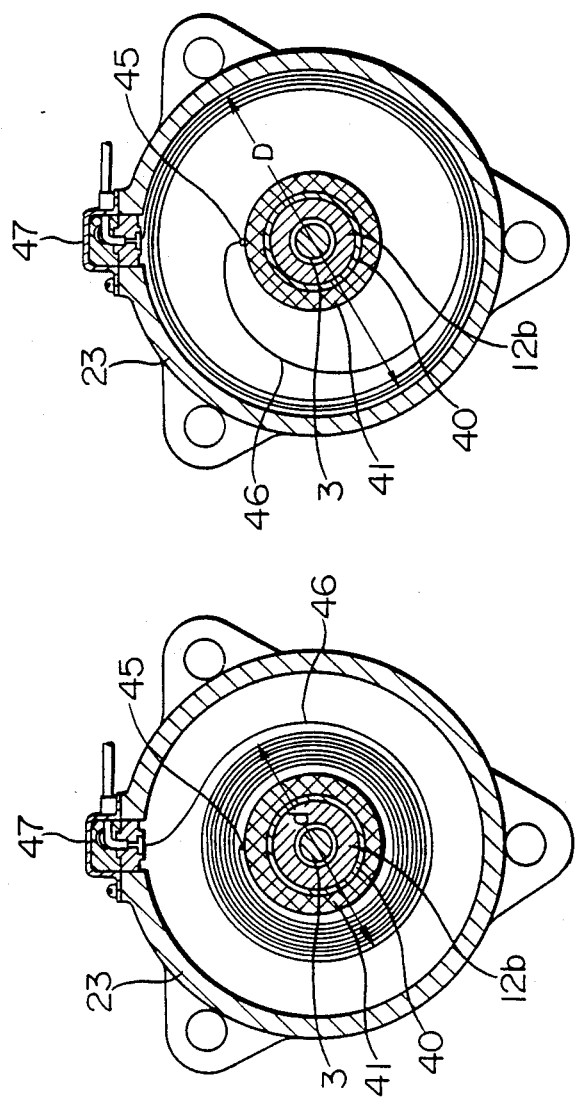

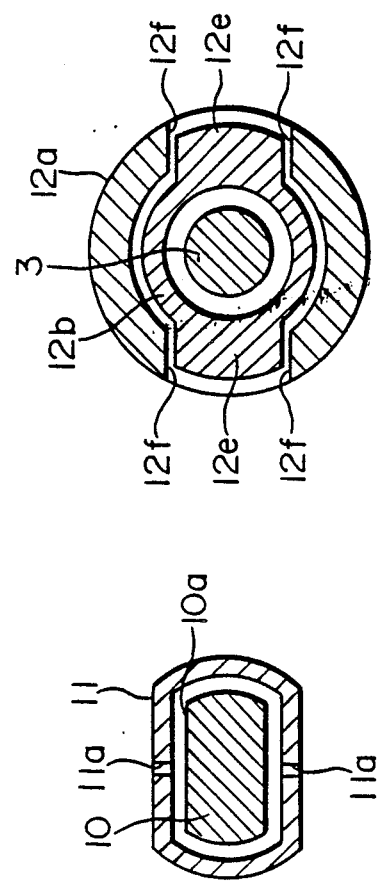

# POWER STEERING APPARATUS WITH UNITARY TORQUE SENSOR AND WORM DRIVING HOUSING

TECHNICAL FIELD

The present invention relates to a power steering apparatus for vehicles which assists the steering force required by the driver of a vehicle to steer the steerable wheels by means of the rotational force of an electric motor.

BACKGROUND ART

Many power steering apparatuses have been developed in which based on a detected steering torque exerted on a steering wheel by the driver of a vehicle, an electric motor for steering assistance is driven to operate so that the force applied to the steering wheel by the driver is assisted by the rotational force of the motor to provide the driver with good steering feel.

Of the power steering apparatuses of the type described above, there is a so-called column-type power steering apparatus in which a torque sensor and an electric motor are installed on a steering shaft or column, which is operatively coupled to a steering wheel, so as to provide relatively ample space for maintenance out of the elements in the passenger.

In this type of power steering apparatus, the steering column comprises an input shaft operatively coupled to the steering wheel, an output shaft operatively coupled to a motion-conversion mechanism which converts rotational movement of the steering wheel into steering movement of the steerable wheels, and a torsion bar through which the input and output shafts are connected with each other in a coaxial relation. The steering torque exerted on the steering wheel by the driver is detected by the torque sensor such as a potentiometer provided on the junctions of the input and output shafts as a relative displacement between the input and output shafts due to a twist of the torsion bar, e.g., as an output voltage of the potentiometer. The rotational force of the motor is transmitted to an intermediate portion of the output shaft near the location at which the torque sensor is installed.

With the power steering apparatus as constructed above, due to the arrangement where the potentiometer serving as the torque sensor is mounted on the steering column which rotates together with the steering wheel, the application of an input voltage to and the taking out of an output voltage from the potentiometer are effected through slip rings, which are disposed around the potentiometer, and brushes which are secured to a housing surrounding the steering column and which are in electrical and sliding contact with the slip rings. However, such an arrangement involves the following disadvantages: torque detection accuracy is unavoidably reduced due to improper setting in the contact pressure between the brushes and slip rings upon assembly thereof, wear on the brushes over time or the like; as a result of improper electrical contact between the brushes and slip rings caused by vibrations, continuous torque detection becomes impossible.

Further, the above-mentioned conventional power steering apparatus includes a speed-reduction mechanism in the form of a worm gear comprising a worm shaft and a worm wheel, which is interposed between the output shaft and the motor to obtain an appropriate steering speed as well as a sufficient steering assistance in the course of transmission of the rotational force from the motor to the output shaft. In this type of speed-reduction mechanism, however, it is impossible to adjust the engagement clearance or backlash between the worm shaft and the worm wheel upon assembly thereof. As a consequence, variations in the engagement clearance are normally accommodated by enhancing the machining accuracy in the distance between the axis of the worm shaft and that of the worm wheel, i.e., the machining accuracy of a first housing on which the worm shaft is journalled and of a second housing on which the output shaft having the worm wheel fitted thereon is journalled. In this case, however, such high accuracy machining is time-consuming and it is still difficult to eliminate the variations to any substantial extent so that unpleasant transmission noise resulting from excessive engagement clearance is generated, or on the contrary, the transmission resistance at the engaging portions of the worm shaft and the worm wheel is increased due to excessively small amounts of engagement clearance, thus reducing power transmission efficiency. As a result, satisfactory steering assistance can not be obtained.

Moreover, in cases where maintenance and/or repair of the power transmitting portions of the power steering apparatus are conducted after it has been assembled in the above manner, disassembling and re-assembling thereof require a great deal of labor so that maintenance and/or repair is cumbersome and can not be effected in an efficient manner.

DISCLOSURE OF THE INVENTION

In view of the above, the present invention is intended to obviate the above-described problems of the conventional art.

An object of the present invention is to provide a power steering apparatus in which an input voltage is supplied to and an output voltage is taken out from a torque sensor without using any slip rings.

Another object of the present invention is to provide a power steering apparatus in which the engagement clearance between a worm shaft and a worm wheel can be adjusted upon assembly thereof.

A further object of the present invention is to provide a power steering apparatus which is capable of improving the accuracy in detection of steering torque given to a steering wheel, suppressing the generation of transmission noise, enhancing the power transmission efficiency in the course of power transmission from the motor to a steering column through a speed-reduction mechanism, and considerably reducing the labor required for maintenance and repair of the power steering apparatus.

In order to achieve the above objects, a power steering apparatus in accordance with the present invention comprises:

a steering wheel;

a steering column having one end connected with the steering wheel and the other end operatively connected with the steerable wheels;

a first cylindrical housing surrounding the steering column;

a worm wheel disposed in the first housing and firmly fitted on the steering column;

a torque sensor disposed in the first cylindrical housing for detecting a steering torque exerted on the steering wheel by a driver;

a multi-lead strap wound around the steering column and accommodated in the first housing, the multi-lead strap having one end electrically connected to the torque sensor and the other end to terminal means which is disposed outside the steering column;

a second housing disposed adjacent the first housing and having one end closed and the other end open;

a worm shaft disposed in the second housing and having a tip end rotatably supported by the second housing at its closed end side, a basal end rotatably supported by the second housing at its open end side, and worm teeth formed on the outer periphery thereof at a location intermediate the ends, the worm teeth being in meshing engagement with the worm wheel; and a motor installed on the second housing at its open end and operatively connected with the worm shaft, the motor being driven to run in accordance with the steering torque detected by the torque sensor.

According to the present invention, by way of the multi-lead strap directly connecting between the terminals secured to the steering column housing and the torque sensor, an input voltage is supplied to the torque sensor from an external power source and at the same time an output voltage is taken out from the torque sensor. If the engagement clearance between the worm shaft and the worm wheel is improper, the worm shaft can be removed from the second housing through its open end in the axial direction and replaced with another appropriate one so as to properly adjust the engagement clearance.

The above and other objects, features and advantages of the present invention will become more apparent from the following detailed description of a presently preferred embodiment thereof when taken in conjunction with the accompanying drawings.

BRIEF DESCRIPTION OF THE DRAWINGS

FIGS. 3 and 4 are cross sectional views, on an enlarged scale, taken along the line III—III of FIG. 1, but showing the different winding states of a take-out lead line of the torque sensor;

FIGS. 6 and 7 are cross sectional views, on an enlarged scale, of the steering column taken along the lines VI—VI and VII—VII, respectively, of FIG. 1.

BEST MODE FOR CARRYING OUT THE INVENTION

A preferred embodiment of a power steering apparatus in accordance with the present invention will now be described with reference to the accompanying drawings.

Figure 1:
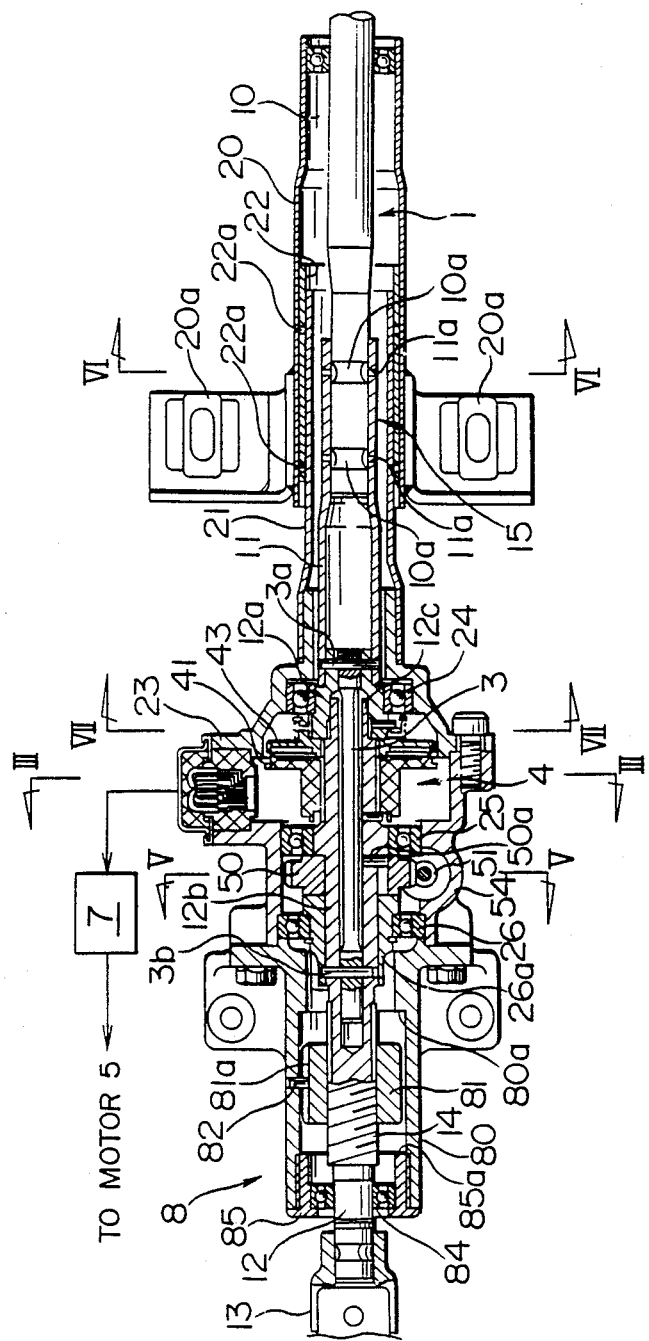
FIG. 1 is a side elevational view, in longitudinal cross section, of a power steering apparatus according to the present invention.

In FIG. 1, there is illustrated a power steering apparatus for vehicles constructed in accordance with the principles of the present invention. The power steering apparatus illustrated is of a so-called safety steering wheel structure which is adapted to absorb any excessive impact acting on a steering wheel in the axial direction of a steering column for protecting the driver of a vehicle in the event of a collision.

The power steering apparatus includes a steering shaft or column, generally indicated by reference numeral 1, which is adapted to rotate about its own axis together with the turning motion of a steering wheel. The steering column 1 comprises an upper shaft 10 having an unillustrated steering wheel fixedly secured to the upper end thereof (the right-side end in FIG. 1) in a coaxial relation, a lower shaft 12 coupled at its upper end to the lower end of the upper shaft 10 in a coaxial relation through a coupling member 11 in the form of a thin-walled hollow cylinder which is formed at its upper end with a flat portion, as clearly shown in FIG. 6. Similar to the coupling member 11, the upper shaft 10 is formed at its lower end with a flat portion, as shown in FIG. 6, which has on its outer peripheral surface a pair of annular grooves 10a, 10a spaced in the axial direction by an appropriate distance. The coupling member 11 has at its upper portion two rows of small round holes 11a, 11a . . . formed therethrough at locations axially spaced one row from the other by the same distance as that between the annular grooves 10a, 10a. The flat portion of the upper shaft 10 is first inserted into the flat portion of the coupling member 11 with a limited clearance formed therebetween, as illustrated in FIG. 6, and then the round holes 11a, 11a . . . in the coupling member 11 are disposed radially outside the annular grooves 10a, 10a in the upper shaft 10 in alignment therewith. Thereafter, a molten resin is poured into the annular grooves 10a, 10a through the small round holes 11a, 11a . . . and cooled to solidify so as to connect the upper shaft 10 and the lower shaft 12 with each other.

In this connection, it is to be noted that a coupling portion 15, which is constituted by the confronting flat portions of the upper and lower shafts 10, 12 and the solidified resin filled therebetween, has sufficient strength against circumferential forces imposed between the upper and lower shafts 10, 12 during normal steering operations so that it forms a strong coupling between the upper and lower shafts 10, 12, but on the other hand, when subjected to an excessively great impactive force acting in the axial direction, the resin coupling between the upper and lower shafts 10, 12 is broken under shear stress, permitting the upper shaft 10 to move relative to the lower shaft 12 in the axial direction so as to absorb the impactive force.

The upper shaft 10 is disposed in and supported by a cylindrical upper housing 20, which is fitted at its lower end over the upper end of a cylindrical coupling housing 21 surrounding the coupling member 11, through a ball retainer member 22 in the form of a thin-walled cylinder which retains two rows of small balls 22a, 22a . . . at locations axially spaced one row from the other by an appropriate distance. The upper housing 20 is fixedly secured to a portion of the vehicle body through a bracket 20a disposed outside the lower end of the upper housing 20, and unillustrated fastening bolts. The bracket 20a serves as a one-way bracket a portion of which is broken by an excessively great force acting on the upper housing 20 in the axially downward direction thereof.

In this arrangement, if an excessively great impactive force is imposed on the upper shaft 10 in the axially downward direction, the resin coupling the upper and lower shafts 10, 12 will be broken and at the same time the bracket 20a supporting the upper housing 20 on the vehicle body will also be broken, whereby the upper shaft 10 is caused to displace relative to the coupling member 11, and simultaneous with this, the upper housing 20 is also caused to displace relative to the coupling housing 21. During such a relative displacement between the upper and coupling housings 20, 21, the impactive force is absorbed by frictional resistance which is created between the small balls 22a, 22a . . . held between the upper and lower housings 20, 21 and the inner and outer peripheral surfaces of these housings, as is well known in the art.

The lower shaft 12 is accommodated in a cylindrical lower housing 23 disposed beneath the coupling housing 21. The lower shaft 12 comprises an upper input shaft 12a and a lower output shaft 12b which are connected with each other through a torsion bar 3 in axial alignment with each other. The torsion bar 3 has a reduced-diameter portion of uniform circular cross section formed at the longitudinal center thereof. The input shaft 12a is journalled by the coupling housing 21 through ball bearings 24, and it is formed of a short hollow cylinder having an axial bore which extends along the central axis of the cylinder over the entire axial length thereof. The upper end of the input shaft 12a is inserted into the lower end of the coupling member 11 and fixedly coupled thereto by fastening pins 3a radially extending therethrough, together with the upper end of the torsion bar 3 which is received in the input shaft bore. As a result, the input shaft 12a rotates together with the rotation of the upper shaft 10, i.e., with the turning of the steering wheel.

The output shaft 12b is journalled through ball bearings 25, 26 by the lower housing 23 at the central and lower portions thereof, respectively. The lower end of the torsion bar 3 is inserted in an axial bore formed in the output shaft 12b along the axis thereof, and fixedly secured to the output shaft 12b by means of fastening pins 3b radially extending therethrough. On the other hand, the upper end 12c of the output shaft 12b is fitted into the hollow interior of the input shaft 12a with a limited annular clearance formed therebetween so as to serve as a bearing for the lower end of the input shaft 12a. Further, as depicted in FIG. 7, the input and output shafts 12a, 12b are each provided at their confronting portions with stops 12e, 12f, respectively, for restricting any excessive amount of relative circumferential displacement between the input and output shafts 12a, 12b resulting from an excessive amount of twist of the torsion bar 3. The lower end of the output shaft 12b is coupled through a universal joint 13 to an unillustrated steering gear which acts to convert the turning motion of the steering wheel into a linear motion in the transverse direction of the vehicle body for steering the vehicle in such a manner that the steerable wheels are caused to steer in accordance with the direction and the angle or amount of rotation of the output shaft 12b.

When a steering torque is imposed on the upper shaft 10 due to a steering operation of the driver, the input shaft 12a is caused to turn about its own axis in accordance with the steering torque on one hand, but the motion-converting operation of the steering gear is restricted by frictional forces acting on the steerable wheels from the road surface on which the vehicle is traveling, thereby suppressing the rotational motion of the output shaft 12b which is operatively connected with the steering gear. As a result, the torsion bar 3 interposed between the input and output shafts 12a, 12b is forced to twist in correspondence to the direction and magnitude of the steering torque whereby an amount of relative displacement corresponding to the twist is produced between the input and output shafts 12a, 12b.

The torque sensor 4 for detecting steering torque comprises a sleeve 40 which is loosely fitted over the output shaft 12b, and a potentiometer installed on the sleeve 40 in such a manner that it provides an output voltage which varies with the amount of relative displacement between the input and output shafts 12a, 12b. The sleeve 40 has its opposite end faces placed in abutment with the lower end of the input shaft 12a and an upper shoulder, respectively, which is formed on an enlarged diameter portion of the output shaft 12b at a location intermediate the ends thereof at which the ball bearing 25 is mounted on the output shaft 12b, so as to suppress the axial movement of the sleeve 40.

Figure 2:
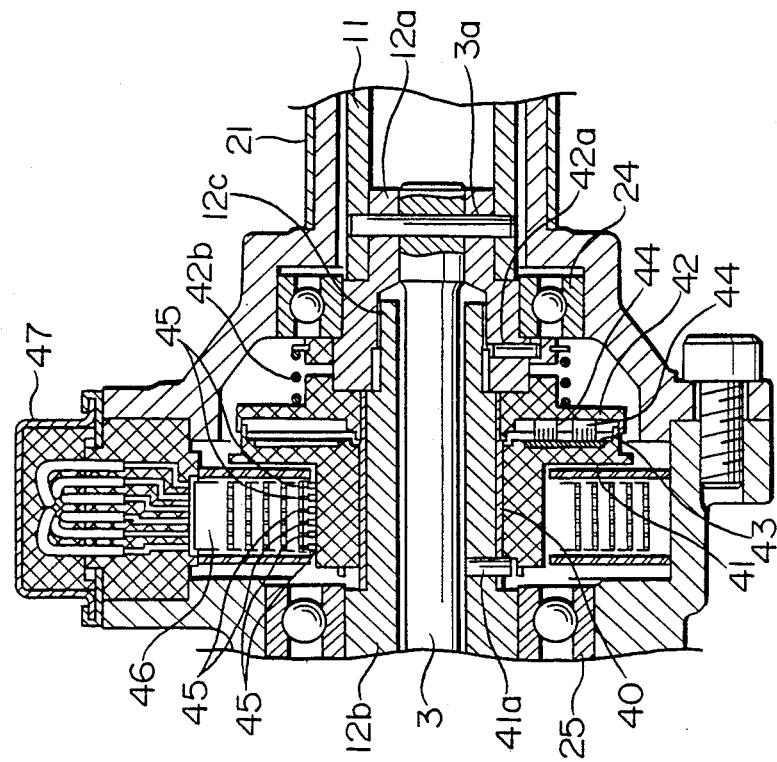
FIG. 2 is a cross sectional view, on an enlarged scale, of an essential portion of the power steering apparatus of FIG. 1, showing the mounting state of a torque sensor and its related members disposed nearby.

FIG. 2 shows the arrangement of the torque sensor 4 and its related parts on an enlarged scale. As clearly seen from this figure, the torque sensor 4 comprises a first holder 41 press fitted over the sleeve 40 and engaged by a dowel pin 41a, which is implanted in the outer peripheral surface of the output shaft 12b, so that it together with the sleeve 40 is prevented from rotation relative to the output shaft 12b, and a second holder 42 holding the torque sensor 4. The second holder 42 comprises a lower half rotatably fitted over the sleeve 40, and an upper half loosely fitted over the lower end portion of the input shaft 12a, the upper half being engaged by a dowel pin 42a, which is implanted in the outer peripheral surface of the input shaft 12a, so that it is prevented from rotation relative to the input shaft 12a. A biasing spring 42b is disposed under compression between the second holder 42 and the ball bearing 24 supporting the input shaft 12a for biasing the second holder 42 in the downward direction toward the first holder 41 so that the upper end face of the first holder 41 and the lower end face of the second holder 42 are maintained substantially perpendicular to the axis of the lower shaft 12 in an axially spaced face-to-face relation with respect to each other with a predetermined axial clearance formed therebetween. The first holder 41 is concentrically provided on its upper end face with an annular resistance element 43 having an appropriate radial width, and on the other hand, the second holder 42 is provided at its lower end face with detector elements 44 which are radially spaced from each other and which are placed in sliding contact with the resistance element 43 at appropriate circumferential locations. Though in FIG. 2, two detector elements 44 are illustrated of which one serves as a backup if the other should fail, it is also possible to employ only one or more than two detector elements 44 if desired.

The holder 41 has a cylindrical lower portion, as shown in FIG. 2, which is provided on its outer peripheral surface with a plurality of input/output terminals 45, 45 . . . disposed at appropriate intervals in the axial direction. The input/output terminals 45, 45 . . . comprise two pairs of input terminals electrically connected to the opposite ends of the resistance element 43 through the interior of the first holder 41, and two output terminals electrically connected to the detector elements 44, 44, respectively, through an unillustrated pre-amplifier built in the first holder 41. The input/output terminals 45, 45 are electrically connected to a terminal box 47 secured to the lower housing 23 via a lead line 46 in the form of a flat cable strap including, in the illustrated embodiment, six lead wires which are respectively connected with the terminals 45, 45 . . . , arrayed in one direction and covered with a common insulating sheath. In this manner, the resistance element 43 is electrically connected at its one end to an unillustrated external source of power, and at the other end grounded through the multi-lead strap 46 and the terminal box 47 so that an input voltage is imposed across the opposite ends of the resistant element 43, and an output voltage of the torque sensor 4 representative of the angular position of contact of the detector elements 44 is taken out from the terminal box 47 via the input/output terminals 45, 45 . . . connected with the detector elements 44 and the multi-lead strap 46.

As shown in FIGS. 3 and 4, which are enlarged cross sectional views taken on the line III—III of FIG. 1 but show different operating states, the multi-lead strap 46 is wound around the first holder 41 in one direction in a plurality of turns and accommodated in the lower housing 23. The connecting positions of the multi-lead strap 46 at the side of the input/output terminals 45, 45 . . . rotate in accordance with the rotation of the output shaft 12b due to a steering operation by the driver, but on the other hand, the connecting positions of the input-/output terminals 45, 45 . . . at the side of the terminal box 47 are stationary, and the winding state of the multi-lead strap 46 in the lower housing 23 varies according to the rotational or angular position of the steering wheel. That is, in cases where the multi-lead strap 46 is wound around in a clockwise direction when looked at from the steering wheel side as shown in FIGS. 3 and 4, there will be a difference between the number of turns (n) of the multi-lead strap 46 when the steering wheel is turned to a first limit position in the right-hand or clockwise direction as shown in FIG. 3 and that (N) when the steering wheel is turned to a second limit position in the left-hand or counter-clockwise direction as shown in FIG. 4, this difference being equal to the number of rotations of the steering wheel from the first limit position to the second limit position if the thickness of the multi-lead strap 46 is neglected. Thus, the outside diameter (d) in FIG. 3 and the outside diameter (D) in FIG. 4 of the turns of the multi-lead strap 46 are determined by the length of the multi-lead strap 46 and the difference between the number of turns (n) in FIG. 3 and the number of turns (N) in FIG. 4.

If the length of the multi-lead strap 46 is excessively short or shorter than a predetermined length, the multi-lead strap 46 may wind around the outer peripheral surface of the cylindrical portion of the first holder 41 when the steering wheel is turned by the driver in the right-hand or clockwise direction, whereupon it would be subjected to tensile forces upon further turning of the steering wheel. On the contrary, if the multi-lead strap 46 is excessively long or longer than a predetermined length, the multi-lead strap 46 may be repeatedly bent or folded in the lower housing 23 when the steering wheel is turned in the left-hand or counter-clockwise direction. In either of these cases, there is a possibility of the multi-lead strap 46 being broken and/or disconnected. In this connection, the possible range of turning of the steering wheel in ordinary vehicles such as automobiles is about 2.5 turns to the right (clockwise) and left (counter-clockwise) direction from the central or neutral position which the steering wheel takes when the vehicle runs straight. Accordingly, in ordinary vehicles, it is possible to avoid occurrence of breaks and/or disconnections of the multi-lead strap 46 as described above by appropriately setting the length and number of turns of the multi-lead strap 46 as follows: the difference $(n - N)$ is greater than 5; the minimum outside diameter (d) of turns of the multi-lead strap 46 is slightly larger than the diameter of the cylindrical portion of the first holder 41; and the maximum outside diameter (D) of the multi-lead strap 46 is slightly less than the inside diameter of the lower housing 23 at a location at which the torque sensor 4 is disposed therein.

The output signal of the torque sensor 4 as constructed in the above manner is sent to the input side of a control unit 7 so that, based on the torque sensor output signal, the control unit 7 recognizes the magnitude and direction of the steering torque exerted on the steering wheel by the driver and outputs a drive signal to an electric motor 5 (see FIG. 5), which is used for the purpose of steering assistance and which is electrically connected to the control unit 7 through an unillustrated drive circuit, so that the motor 5 is driven to rotate in the direction corresponding to the turning direction of the steering wheel.

The rotational force of the motor 5 is transmitted to the output shaft 12b through a worm shaft 51 and worm wheel 50. The worm wheel 50 is fitted over the output shaft 12b in a coaxial relation therewith and axially positioned in place with its opposite side surfaces being clamped between the lower shoulder of the enlarged-diameter portion of the output shaft 12b at which the ball bearing 25 is installed, and the upper end face of the cylindrical bearing retainer 26a which is press fitted over the output shaft 12b and on which the ball bearing 26 is fitted. Also, the bearing retainer 26a together with the torsion bar 3 is engaged at its lower portion with the output shaft 12b by means of the fastening pin 3b. Thus, the bearing retainer 26a is restricted against axial and radial movements by means of the output shaft 12b. On the other hand, the ball bearing 26, being fitted over the bearing retainer 26a in an axially positioned state, not only series to support the output shaft 12b in a radial direction but also bears thrust loads acting on the worm wheel 50 and the motion-conversion mechanism. The worm wheel 50 is properly positioned in the circumferential direction by engaging the head of a dowel pin 50a, which is implanted into the outer peripheral surface of the output shaft 12b, into the rectangular groove which is formed in, and axially extends over the length of, the inner peripheral surface of a through bore which is formed axially through the worm wheel 50, whereby the rotation of the worm wheel 50 is transmitted to the output shaft 12b through the dowel pin 50a.

Figure 5:
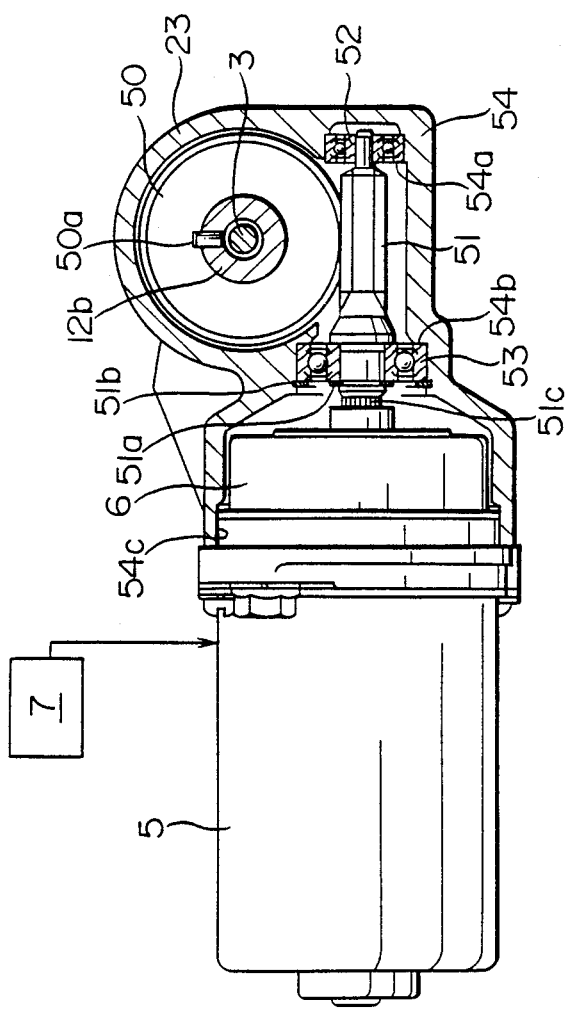
FIG. 5 is a cross sectional view, on an enlarged scale, taken along the line V—V of FIG. 1, showing the arrangement of a power transmission mechanism for transmitting an assisting force from the motor to a steering column.

As shown in FIG. 5, which is an enlarged cross sectional view taken along the line V—V in FIG. 1, a worm-shaft housing 54 in the form of a bottomed cylinder is disposed adjacent and outside, integrally connected with, the lower housing 23. The worm-shaft housing 54 has a large-diameter opening formed at one side thereof and has its longitudinal axis disposed perpendicular to the axis of the lower housing 23. Inside the worm-shaft housing 54, the worm shaft 51 is journalled at its opposite ends by a pair of ball bearings 52, 53 with its axis substantially perpendicular to the axis of the output shaft 12b. On the outer peripheral surface of the axially intermediate portion of the worm shaft 51, there is formed worm teeth or threads which are in meshing engagement with the teeth or threads on the outer peripheral surface of the worm wheel 50. One end or the tip (i.e., the right-hand and in FIG. 5) of the worm shaft 51 is of a diameter equal to or less than the minor diameter of the worm threads (i.e., the diameter of a dedendum circle of the worm threads), and it is inserted into, and rotatably supported by, the ball bearing 52 which is press fitted into the reduced diameter bottomed or closed end of the cylindrical housing 54, whereas the other or basal end (i.e., the left-hand end in FIG. 5) of the worm shaft 51, the diameter of which is equal to or greater than the major diameter of the worm threads (i.e., the diameter of an addendum circle of the worm threads), is rotatably supported by the ball bearing 53 which is press fitted into an intermediate portion of the worm-shaft housing 54. In this manner, the worm shaft 51 is journalled at its opposite ends by the pair of ball bearings 52, 53 with the worm threads meshing with the toothed or threaded outer surface of the worm wheel 50 interposed therebetween. Here, the worm shaft 51 and the ball bearings 52, 53 are assembled together and mounted in the worm-shaft housing 54 in the following manner. First, the ball bearing 53 is fitted over the basal end (i.e., the left-hand end in FIG. 5) of the worm shaft 51 and axially positioned in place with respect to the worm shaft 51 by being firmly clamped between an enlarged or flanged portion formed adjacent the worm threads and a snap ring 51a mounted on the worm shaft 51. Then, the worm shaft 51 with the ball bearing 53 thus mounted thereon is inserted into the worm-shaft housing 54 from the enlarged open end thereof so that the tip (i.e., the right-hand end in FIG. 5) of the worm shaft 51 is fitted into the ball bearing 52 press fitted in a first small-diameter bore 54a in the worm-shaft housing 54 at its closed end, whereas the ball bearing mounted on the basal end of the worm shaft 51 is fitted into a second large-diameter bore 54b, which is formed in the intermediate portion of the worm-shaft housing 54 adjacent its open end in a coaxial relation with respect to the first bore 54a, and axially positioned in place with respect to the worm-shaft housing 51 by being fixedly clamped between an inside shoulder the second bore 54b and a snap ring 51b secured to the radially inner peripheral surface of the bore 54b. Accordingly, the ball bearing 53 serves support the worm shaft 51 not only in the radial direction but also in the axial or thrusting direction so that a thrust load acting on the worm shaft 51 due to the meshing engagement between the threaded outer surface of the worm wheel 50 and the worm threads on the worm shaft 51 is loaded thereon.

The motor 5 for steering assistance has its rotation shaft operatively connected with an electromagnetic clutch 6 in axial alignment with each other. The clutch 6 is provided at its one side with a spigot portion which is fitted into an enlarged socket portion 54c which is formed at the enlarged open end of the worm-shaft housing 51 in a coaxial relation with respect to the bearing mounting bores 54a, 54b, the spigot portion being fixedly secured to the socket portion 54c by means of mounting bolts.

On the outer peripheral surface of the basal end of the worm shaft 51, there is formed an axial spline 51c through which it is engaged with the output shaft of the electromagnetic clutch 6 for integral rotation therewith. In this manner, the rotational force of the motor 5 is transmitted via the electromagnetic clutch 6 to the worm shaft 51 and thence to the output shaft 12b through the worm wheel 50 in mesh with the worm shaft 51.

With the power transmission mechanism as constructed in the above manner, it should be noted that because of the spline connection between the electromagnetic clutch 6 and the worm shaft 51, the motor 5 together with the electromagnetic clutch 6 can be removed from the socket portion 54c of the worm-shaft housing 54 simply by untightening the mounting bolts and then pulling the motor 5 and the electromagnetic clutch 6 outwardly from the worm-shaft housing socket portion 54c in the axial direction. Also, due to the fact that the diameter of the tip portion of the worm shaft 51 is less than the minor diameter of the worm threads thereon, the worm shaft 51 can be easily taken out from the worm-shaft housing 54 through the enlarged open end thereof by removing the snap ring 51b and pulling the worm shaft 51 outward while rotating the worm shaft 51. Accordingly, when the meshing engagement between the worm wheel 50 and the worm shaft 51 is poor or unsatisfactory upon initial assembly thereof, the worm shaft 51 can be taken out from the worm-shaft housing 54 in the above-described manner and replaced with another one whereby the engagement between the worm wheel 50 and the worm shaft 51 can be properly adjusted or improved with ease without adjusting or modifying any other parts or portions. Furthermore, it is possible to effect maintenance and inspection of the transmission mechanism without any difficulty simply by taking out the worm shaft 51 from the worm-shaft housing 54 without disassembling other parts or portions, thus resulting in a substantial improvement in working efficiency.

Supply of driving current to the motor 5 is controlled by means of a control signal which is issued by the control unit 7 based on the steering torque detected by the torque sensor 4. The rotational force of the motor 5 is transmitted to the output shaft 12b through the electromagnetic clutch 6, the worm shaft 51 and the worm wheel 50, as described above, and thence to the rotational-to-linear motion conversion mechanism connected with the lower end of the output shaft 12b so that the steerable wheels are steered to the right or left in accordance with the output of the motion conversion mechanism.

Installed on the lower portion of the output shaft 12b extending downwards from the mounting position of the bearing retainer 26a is a rotation limiting means 8 for limiting the rotation of the output shaft 12b within a predetermined number of turns. As referred to above, the lead line 46 of the torque sensor 46 is chosen to be of just such a length that it is not cut off or broken at its connection with the terminals when the output shaft 12b rotates about 2.5 turns the right or left from the center or neutral position which the vehicle runs straight. If, however, the shaft 12b further rotates in excess of 2.5 turns, the lead line 46 may be cut off or broken. Therefore, the rotation limiting means 8 is provided for preventing any excessive rotation of the output shaft 12b in a mechanical manner thereby to prevent such cuttings or breaks of the multi-lead strap 46. The rotation limiting means comprises a cylindrical housing 80 disposed adjacent, and integrally connected with, the lower portion of the lower housing 23 in a coaxial relation therewith, and a stop nut 81 in the form of an inwardly threaded cylinder loosely fitted into the lower housing 80 with its female threads being engaged with the male threads 14 on the outer peripheral surface of the lower portion of the output shaft 12b.

A guide pin 82 is provided at a substantially longitudinally central portion of the lower housing 80 in such a manner that it radially extends through the cylindrical side wall of the lower housing 80 with its tip projected therein an appropriate distance so as to be engaged with an elongated groove 81a, which is axially formed in the outer peripheral surface of the stop nut 81 over the entire axial length thereof, for checking the rotation of the stop nut 81 relative to the lower housing 80.

Also, threadedly fitted in the lower portion of the lower housing 80 is a cylindrical bearing housing 85 which has a ball bearing 84 press fitted therein for rotatably supporting the lower end of the output shaft 12b. The bearing housing 85 has its upper end face 85a disposed in a face-to-face relation with, and spaced an appropriate axial distance from, a downwardly or inwardly directed shoulder 80a which is formed on the lower housing 80 in an upper portion of the inner peripheral surface thereof. With the above-described arrangement, the stop nut 81, being prevented from rotation by means of the guide pin 82, is caused to axially move along the output shaft 12b through the screwing action of the threaded engagement between the threaded inner surface of the stop nut 81 and the output shaft threaded portion 14 in accordance with the rotation of the output shaft 12b. Such an axial movement of the stop nut 81 is limited within a predetermined range which is defined by the abutment of the upper and lower ends of the stop nut 81 against the downwardly or inwardly directed shoulder 80a in the inner upper portion of the lower housing 80 and the upper end face 85a of the bearing housing 85, respectively. As a result, any further rotation of the output shaft 12b beyond the upper and lower limit positions is prevented. Accordingly, if the axial distance between the shoulder 80a and the upper end face 85a of the stop nut 85 is chosen to be five times greater than the sum of the lead of the threaded portion 14 of the output shaft 12b and the axial length of the stop nut 81, and if the stop nut 81 is initially set at a position axially central between the shoulder 80a and the upper end face 85a of the stop nut 85, the rotation of the output shaft 12b is restricted to 2.5 turns to the right or left from its neutral or straight-forward position whereby cuttings or breaks of the lead line 46 of the torque sensor 4 are securely avoided.

As is clear from the foregoing description, according to the present invention, the taking out of the output signal from the torque sensor secured to the steering shaft operatively connected with the steering wheel and the application of an input voltage to the torque sensor in the form of a potentiometer are effected through the lead line which is accommodated in the worm-shaft housing while being wound around the steering shaft, as a consequence of which there is no or little possibility of improper or inaccurate detection of the steering torque which would otherwise conventionally result from improper or poor electrical connections between the slip rings and the brush, so that steering torque can always be detected with a high level of accuracy.

Further, the worm shaft, which has its tip smaller in diameter than the minor diameter of the worm teeth or threads formed thereon at the intermediate portion thereof, can be easily removed from the worm-shaft housing so that, if there is an improper meshing clearance or unsatisfactory engagement between the worm shaft and the worm wheel, the worm shaft can be removed from the worm-shaft housing and replaced with another one without difficulty thereby to properly adjust the meshing clearance upon their initial assembly. Accordingly, it is possible to prevent the generation of transmission noise resulting from improper engagement between the worm shaft and the worm wheel as well as reduction in the power transmission efficiency. Moreover, it is also possible to significantly reduce the labor and time required to disassemble and re-assemble the transmission mechanism at the time of maintenance and inspection thereof.

We claim:

1. A power steering apparatus for assisting the turning of steerable wheels of a vehicle, comprising:
   a steering column having one end connected with a steering wheel and another, opposite end operatively connected with steerable wheels;
   a unitary housing including a first, cylindrical housing portion (23) surrounding a portion of said steering column, and a second housing portion (54) disposed adjacent said first housing portion, integral therewith and having one end closed and another, opposite end open;
   a worm wheel (50) disposed in said first housing portion and firmly fitted on said steering column;
   a torque sensor (4) disposed in said first housing portion for detecting a steering torque exerted on said steering wheel by a driver;
   a flat, multi-lead strap (46) wound around said steering column and accommodated in said first housing portion, said multi-lead strap having one end electrically connected to said torque sensor and another, opposite end connected to terminal means disposed outside said steering column;
   a worm shaft (51) disposed in said second housing portion and having a tip end rotatably supported by the second housing portion at its closed end, a basal end rotatably supported by the second housing portion at its end, and worm teeth formed on an outer periphery of the worm shaft at a location intermediate the ends, said worm teeth being in meshing engagement with the worm wheel; and
   a motor (5) installed on said open end of the second housing portion and operatively connected with said worm shaft, said motor being driven to run in accordance with the steering torque detected by said torque sensor.

2. A power steering apparatus according to claim 1, wherein the diameter of the tip of said worm shaft is not greater than the minor diameter of said worm teeth of said worm shaft.

3. A power steering apparatus according to claims 1 or 2, further comprising a first bearing (52) press fitted into the closed end of said second housing portion for rotatably supporting the tip of said worm shaft which is slidably inserted therein, and a second bearing (53) fixedly mounted on the basal end of said worm shaft and removably fitted in an intermediate portion of said second housing for rotatably supporting the basal end of said worm shaft.

4. A power steering apparatus according to claim 3, wherein said first and second bearings are disposed in a coaxial relation with each other.

5. A power steering apparatus according to claim 3, further comprising a clutch (6) interposed between said motor and said worm shaft for making and breaking the connection between said motor and said worm shaft, said clutch being accommodated in an open end portion of said second housing portion and having an output shaft which is spline connected with the basal end of said worm shaft for integral rotation therewith so that the output shaft can be slidably moved into or out of engagement with the worm shaft basal end in an axial direction of said second housing portion.

6. A power steering apparatus according to claim 5, wherein said first and second bearings and the output shaft of said clutch are disposed in a coaxial relation with respect to each other.

7. A power steering apparatus according to claim 1, wherein said second housing portion (54) has the form of a cylinder which has an axis perpendicular to an axis of said first cylindrical housing portion.

* * * * *